United States Patent [19]

Boudreaux et al.

[11] 4,104,605

[45] Aug. 1, 1978

[54] THIN FILM STRAIN GAUGE AND METHOD OF FABRICATION

[75] Inventors: Lee J. Boudreaux, Schenectady, N.Y.; James H. Foster, Cincinnati, Ohio

[73] Assignee: General Electric Company, Schenectady, N.Y.

[21] Appl. No.: 723,566

[22] Filed: Sep. 15, 1976

[51] Int. Cl.² .............................................. G01L 1/22
[52] U.S. Cl. .................... 338/2; 73/88.5 R; 338/5; 427/45; 427/99; 427/124
[58] Field of Search ............. 338/2; 73/88.5 R; 106/58; 75/170; 427/45, 99, 124

[56] References Cited

U.S. PATENT DOCUMENTS

| 2,590,566 | 3/1952 | Osborn | 106/58 X |
|---|---|---|---|
| 3,197,335 | 7/1965 | Leszynski | 338/2 X |
| 3,805,377 | 4/1974 | Talmo et al. | 338/2 X |
| 3,828,606 | 8/1974 | Wolter | 73/88.5 R X |

FOREIGN PATENT DOCUMENTS

| 116,903 | 5/1943 | Australia | 75/170 |
|---|---|---|---|
| 4,519,543 | 7/1970 | Japan | 73/88.5 R |

*Primary Examiner*—Richard D. Lovering
*Attorney, Agent, or Firm*—Geoffrey H. Krauss; Joseph T. Cohen; Marvin Snyder

[57] ABSTRACT

A thin film strain gauge fabricated by depositing a first film of a high temperature insulating material upon a surface of an article to be tested, depositing both a thin film of a resistive material and a conducting lead in connection with each end of the resistive pattern upon the surface of the first film and overcoating the resistive strain gauge film and at least a portion of the conducting leads with a second film of high temperature insulating material to protect the strain gauge against corrosion and erosion in its operating environment.

17 Claims, 3 Drawing Figures

THIN FILM STRAIN GAUGE AND METHOD OF FABRICATION

BACKGROUND OF THE INVENTION

The present invention relates to strain gauges, and more particularly, to a novel thin film strain gauge and the method of fabrication thereof.

Dynamic strain sensors are known to be useful for testing of mechanical components, especially when in use in their intended environment. Under certain conditions, such as in low-cycle-fatigue and flutter dynamic strain testing, associated with development of blades for aircraft engine compressors and steam turbines, strain gauges are located on critical stages of the apparatus and, being exposed to conditions of high oxidation, erosion and vibratory stress, experience unacceptable fatigue damage (to the strain sensor element and its associated conductive leads) and premature failure. Strain gauges having extended operating times, when utilized in hostile environments, will eliminate test delays and repeated sensor replacement, to result in potentially large cost savings on test programs.

One common present method of applying strain gauges to parts, such as compressor blades for aircraft engines, consists of preforming a small diameter resistance wire, typically of about 0.8 milli-inches diameter, into a grid pattern and attaching this wire grid to a surface of the part-under-test by plasma- or flame-sprayed Alumina ($Al_2O_3$). The Alumina not only provides electrical insulation from the (generally) electrically-grounded underlying part surface (substrate), but also acts as the "adhesive" medium holding the strain gauge in contact with the substrate, whereby the strain developed in the part may be directly correlated to the change in resistance of the wire grid. At least two problems are known to be associated with this technique: the gauge wire (in order to have a sufficiently large magnitude of resistance to allow a desired accuracy of measurement) occupies a large area upon the surface of the part and the thickness of the sprayed Alumina (which thickness may be as great as 20 milli-inches) is relatively thick, to change the mass, shape and other natural mechanical characteristics of the part-under-test and to reduce the accuracy of the measurement thereon. Further, the porosity of the sprayed $Al_2O_3$ coating both allows leakage of electrical current to the ground potential at the underlying substrate surface and facilitates oxidation and erosion leading toward premature failure of the strain gauge. Therefore, a strain gauge is desired which will not only facilitate a more reliable and accurate measure of the strain occurring in the part-under-test, but will also facilitate this measurement without significantly altering the mechanical characteristics of the part and will do so in a manner maximizing resistance to fatigue, corrosion and erosion while allowing measurement of the strain at a more localized area of the device than presently possible.

BRIEF SUMMARY OF THE INVENTION

In accordance with the invention, a thin film strain gauge is fabricated by depositing a first film of a high temperature insulating material, such as Alumina or Forsterite, to a thickness of several microns upon a surface of the part to be strain tested. A resistor material is deposited upon the insulating film to form a resistive pattern, oriented to respond to strains substantially only in a single dimension; the resistor material is deposited in a thin film ranging in thickness from about 200 Angstroms to greater than 1 micron, dependent upon resistor dimensions and resistive value desired. Conductive leads are deposited to facilitate a flow of electrical current through the resistive pattern. A corrosion-erosion protection layer of insulating material, or this second insulation film and an overlayer of metal film, is deposited over the resistive pattern and at least a portion of the conductive leads and adjacent first insulative film, to complete the thin film strain gauge system, which advantageously has a total thickness ranging from about 4 microns to about 30 microns, whereby the total thickness, mass and distributions thereof do not appreciably affect the mechanical characteristics of the device on which the strain gauge is deposited.

Accordingly, it is one object of the present invention to provide a novel thin film strain gauge.

It is another object of the present invention to provide a novel method for the fabrication of this novel thin film strain gauge.

These and other objects of the present invention will become apparent upon a consideration of the following detailed description and the accompanying drawings.

DETAILED DESCRIPTION OF THE INVENTION

Figure 1:
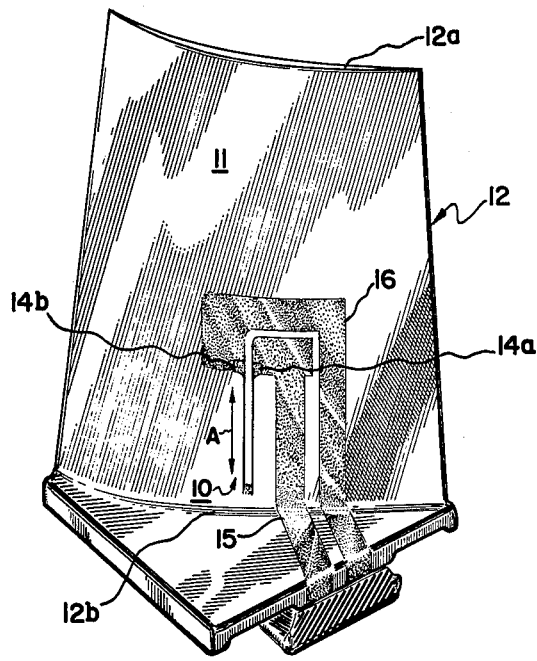
FIG. 1 is a perspective view of a jet engine compressor blade having fabricated thereon a thin film strain gauge in accordance with the principles of the present invention.

Referring now to the Figures, thin film strain gauge 10 is fabricated upon a surface 11 of a part or substrate, such as jet-engine compressor blade 12, to be tested. The strain gauge includes a pair of conductive lead means 14a and 14b to facilitate suitable electrical connection to be made between gauge 10 and conductor means, such as low resistance leads 15 and 16, to allow reading of the value of strain gauge resistance. External equipment (not shown) is coupled to conductor means 15 and 16 at a point on article 12 removed from the location of strain gauge 10 and from the relatively high stresses, strains and vibratory motion of the working environment of the strain gauge.

Figure 2A:
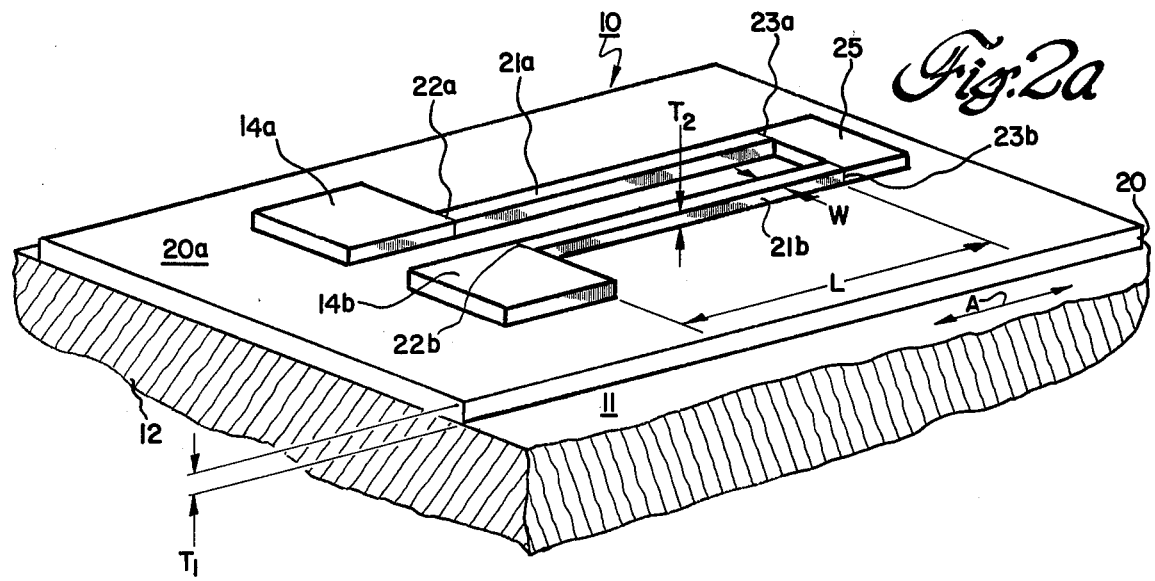
FIG. 2a is a perspective view of a section of a part-under-test and of a portion of a thin film strain gauge being fabricated thereon.
Figure 2B:
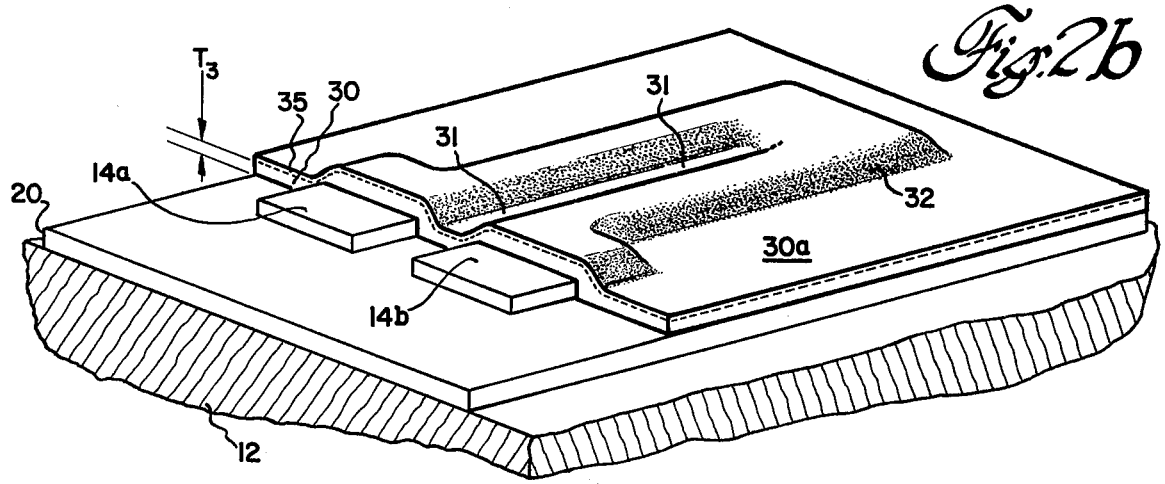
FIG. 2b is a perspective view of the completely fabricated strain gauge in accordance with the principles of the present invention.

Strain gauge 10 is fabricated upon substrate surface 11 by initially depositing a first film 20 (FIG. 2a) of a high temperature insulative material, such as Alumina ($Al_2O_3$) or Forsterite ($2MgO-SiO_2$) and the like, to a first thickness $T_1$ of between about 2 microns and about 6 microns. Preferably, the high temperature insulating film is deposited by R.F. sputtering, especially when fabricating a strain gauge on a part, such as a jet-engine compressor blade, which is fabricated of a material (such as titanium) which cannot be subjected to a sufficiently high temperature to allow chemical vapor deposition of the film to be feasible. R.F. sputtering is also preferable as the Alumina or Forsterite film thus deposited is apparently harder and somewhat less porous than plasma- or flame-sprayed films of the same material, whereby porosity (leading to leakage of electric current through layer 20 to the generally conductive substrate 12) is avoided.

At least one strain-sensing member 21 is fabricated by depositing a thin film of a resistive material, such as Nichrome, platinum, MoSi, CrSi and the like, upon the top surface 20a of the high temperature insulative film. The resistive material may be deposited by R.F. sputtering or vacuum evaporation and may be shaped by masking techniques or deposited as a continuous film and then formed to the desired resistor pattern utilizing processes such as photo-etching, laser machining and the like. The resistive film is deposited to a thickness $T_2$ having a range from about 200 Angstroms to greater than 1 micron, dependent upon the desired magnitude of resistance to be achieved and the physical dimensions of the resistor pattern, as constained by the area of the substrate available for strain gauge deposition. Illustratively, in the jet-engine compressor blade example illustrated in FIG. 1, wherein strain gauge 10 is to monitor vibratory strain the direction of arrows A, between the top 12a to the base 12b of the blade, strain gauge 10 comprises a pair of parallel resistance members 21a and 21b having their direction of elongation disposed in the direction of strain to be measured, e.g. parallel to arrows A. In the illustrated embodiment the resistive members have an aspect ratio, i.e. the ratio of length L to width W, on the order of about ⅛ inch: 4 mils to about ¼ inch: 4 mils, whereby the resistive member responds to strain substantially only along its elongated (length) dimension. It should be understood that these dimensions are exemplary of only one of large number of possible aspect ratios and that each particular usage dictates a particular set of dimensions for the strain gauge utilized, without departing from the principles of the present invention. It should also be understood that the thickness $T_2$ of each of the at least one resistive member(s) 21 is substantially constant, due to the deposition of the resistive member(s) by the same source evenly depositing resistive material upon insulating layer 20a, and that the resistivity (R ohms/square) is dependent only upon this thickness, allowing the design resistance to be chosen by proper choice of the aspect ratio.

After deposition of the at least one resistive member 21, a layer of conductive lead-forming material, such as nickel, gold and the like, is deposited on the insulating layer surface 20a either through a mask or as a continuous film with subsequent pattern formation via the aforementioned photo-etching, laser-machining and like processes, to form at least a pair of pads 14a and 14b, each in electrical connection with one of the ends 22a or 22b of the resistive pattern.

Dependent upon the particular shape, or shapes, selected for the one or more resistive members 21, a series-connective conductive pattern 25 may be required to couple the remaining ends of a plurality of resistance elements in the desired electrical pattern. This is especially preferably when, as in the embodiment illustrated, both strain guage connection points (pads 14a and 14b) are desirably brought forth from closely adjacent ends of more than one resistance element, whereby the opposite ends 23a and 23b, respectively, must be brought into electrical series connection by conductive path 25 electrically coupled therebetween. It should be understood that pad 25 may be simultaneously formed of resistive material integrally deposited with members 21a and 21b, provided that the surface area of portion 25 is of sufficiently large value (low aspect ratio) to cause the resistance of portion 25 (between member ends 23a and 23b, respectively) to have a magnitude much less than the resistance of each resistive member being coupled thereby; this design criteria prevents any strain transverse to the preferred direction (along length L of the resistive members) from producing a sufficiently large change in the total sensor resistance, thereby maintaining a response substantially only for strain along the elongated sensor dimension. Advantageously, the use of a plurality of parallel, relatively-high-resistance members 21 enhances this requirement, as the total change in resistance magnitude, responsive to strain, is the additive result of the change in each member.

After deposition of the required resistive pattern, its conductive leads and any interconnections, upon top surface 20a of the insulative base layer 20 (FIG. 2a) a second film 30 (facilitating corrosion-erosion protection) also preferably formed by R.F. sputtering of Alumina or Forsterite, is deposited upon, and cooperates with, a portion of film top surface 20a to completely enclose all of the at least one resistive members 21, any interconnecting conductive portions 25 utilized therewith, and at least a portion of each conductive lead-connection pad 14 in the region adjacent the connection of each pad to the resistive pattern. Protective film 30 may be deposited with a thickness $T_3$ of as little as about 2 microns, which relatively thin protective layer tends to have a surface 30a relatively conformally coating the underlying strain gauge portions and, being somewhat undulent, may disturb air flow over the surface 11. Smoother protective layer surfaces may be achieved by depositing relatively greater thicknesses of film 30, whereby the deposited molecules tend to fill in such features as the channel 31 between the parallel resistive members as well as to smooth the slopes 32 of the boundaries of the underlying pattern.

We have found that the R.F. sputtered films of Alumina and Forsterite possess an apparent hardness and relative smoothness preventing erosion or chipping away of surface 30a during operation in a hostile environment. In extremely hostile environments, the use of a top protective film 35, of a metallic material such as nickel, chrome, nickel-platinum and the like, may be deposited upon the protective film surface 30a, with thicknesses in the range of 2 microns to 5 microns to provide additonal protection against corrosion and erosion.

There has just been described a thin film strain gauge and method for the fabrication thereof upon the surface of an article to be strain tested, which thin film strain gauge is of sufficiently small size (having a total thickness in the range of about 4 microns to about 1.5 milli-inches) and mass whereby aerodynamic and other mechanical characteristics of the part remain relatively unchanged, while preventing premature failure of the gauge due to oxidation, erosion, corrosion and the like processes.

While the present invention has been described with reference to one preferred embodiment thereof, many variations and modifications will now become apparent to those skilled in the art. It is our intent, therefore, to be limited not by the present disclosure herein, but only by the appending claims.

What is claimed is:

1. A method for fabricating a thin film resistive strain gauge upon a surface of an article, comprising the steps of:

R.F. sputtering a first film of an insulating material, selected from the group consisting of Alumina and Forsterite, to a first thickness upon said article surface;

selecting a strain-sensing resistive material from the group of materials consisting of Nichrome, platinum, molybdenum silicide and chromium silicide;

fabricating a pattern of the strain-sensing resistive material upon a surface of said first insulating film furthest from said article; fabricating, upon said surface of said first insulating film and substantially co-planar with said pattern, conduction means for electrically coupling directly to said pattern to ascertain the value of the resistance thereof; and R.F. sputtering a second film of the selected insulating material directly in contact with and covering all of said pattern and at least a portion of said conduction means and adjacent regions of said first insulating film.

2. A method as set forth in claim 1, further comprising the steps of: selecting an erosion-resistant metallic material from the group consisting of nickel, chromium and nickel-platinum; and fabricating a protective film of the selected metallic material upon a surface of said second insulating film furthest from said article surface.

3. A method as set forth in claim 1, wherein said first insulating film is deposited to a thickness of between about 2 microns and about 6 microns.

4. A method as set forth in claim 1, wherein said second insulating film is deposited to a thickness of between about 2 microns and about 6 microns.

5. A method as set forth in claim 1, wherein said resistive material pattern is deposited to a thickness of at least 200 Angstroms.

6. A method as set forth in claim 5, wherein the resistance material pattern is fabricated by R.F. sputtering.

7. A method as set forth in claim 5, wherein the resistance material pattern is fabricated by vacuum evaporation.

8. A thin film strain gauge for use upon a surface of an article, comprising:

a first film of an insulating material fabricated directly upon said article surface, said insulating material being one of Alumina ($Al_2O_3$) and Forsterite ($2MgO\text{-}SiO_2$);

at least one member of a resistive strain-sensing material fabricated directly upon a surface of said first insulating film furthest from said article surface;

said strain-sensing material selected from a group consisting of Nichrome, platinum, molybdenum silicide and chromium silicide;

first means fabricated upon said surface of said first insulating film and substantially co-planar with said at least one member for electrically coupling to said at least one member to ascertain the value of the resistance thereof; and a second film of the selected insulating material fabricated directly over said at least one member, a portion of said first means and adjacent regions of said first insulating film surface to encapsulate said at least one element and said portion of said first means in cooperation with said first insulating film.

9. A strain gauge as set forth in claim 8, wherein said first film has a thickness of between about 2 microns and about 6 microns.

10. A strain gauge as set forth in claim 8, wherein said second film has a thickness of between about 2 microns and about 6 microns.

11. A strain gauge as set forth in claim 8, wherein said at least one member is fabricated to a substantially constant thickness of at least 200 Angstroms.

12. A strain gauge as set forth in claim 8, wherein each of said at least one members is shaped and oriented to respond to strain substantially only in a single direction.

13. A strain gauge as set forth in claim 8, wherein a plurality of resistive members are utilized, each member being elongated, the elongated dimension of all members being arranged parallel to one another; and further comprising second means for conductively coupling said members together in a desired pattern and to said first means.

14. A strain gauge as set forth in claim 13, wherein said members, said first means and said second means all have substantially the same thickness.

15. A strain gauge as set forth in claim 8, further comprising a protective film of a metallic material fabricated upon a surface of said second insulating film furthest from said article surface.

16. A strain gauge as set forth in claim 15, wherein said protective film has a thickness of between about 2 microns and about 5 microns.

17. A strain gauge as set forth in claim 16, wherein said metallic material is selected from the group consisting of nickel, chrome and nickel-platinum.

* * * * *